Sept. 6, 1932.  N. OCHINOFF  1,876,321
AUTOMATIC SWITCH FOR LEFT-RIGHT TURNS OF MOTOR VEHICLE DEVICES
Filed March 19, 1929
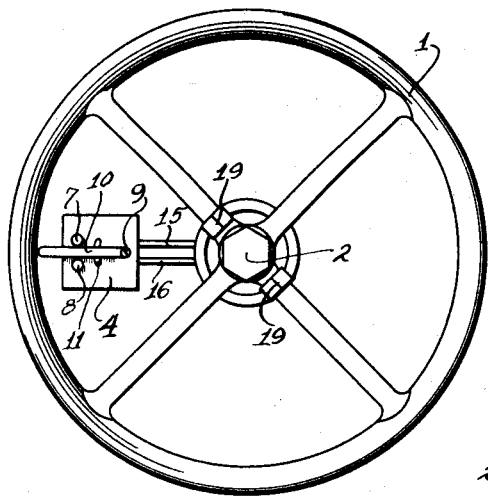
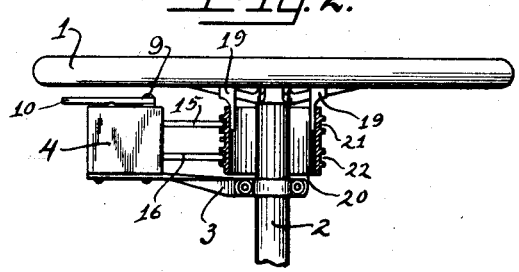
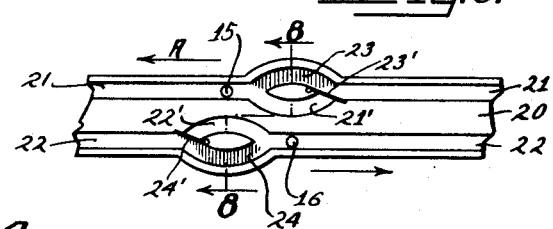
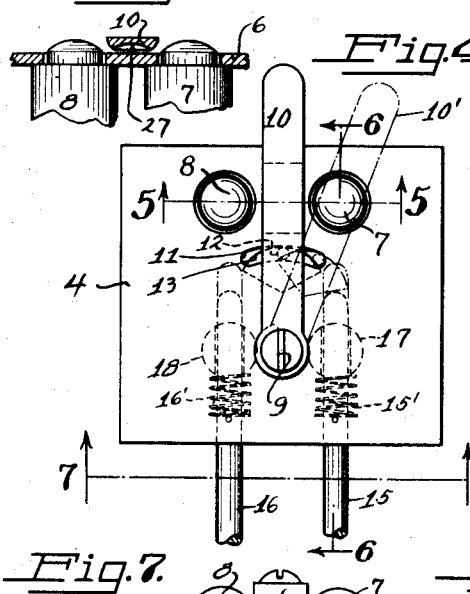
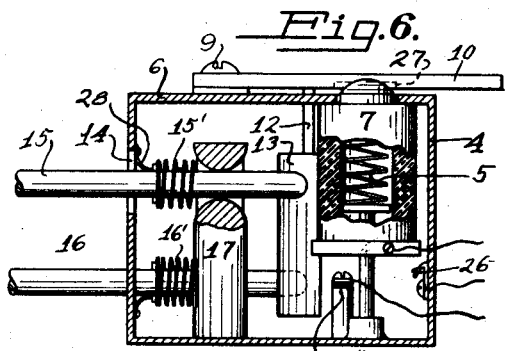
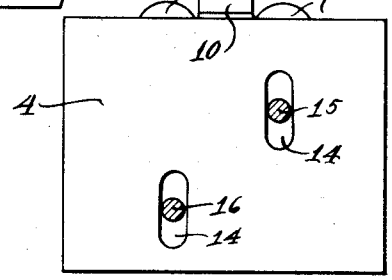
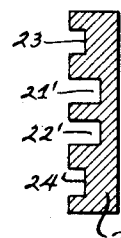
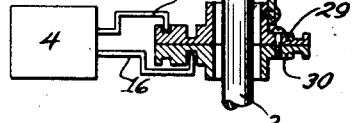
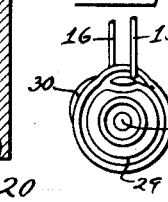
INVENTOR.
Nicolas Ochinoff Patented Sept. 6, 1932

1,876,321

UNITED STATES PATENT OFFICE

NICOLAS OCHINOFF, OF SAN FRANCISCO, CALIFORNIA

AUTOMATIC SWITCH FOR LEFT-RIGHT TURNS OF MOTOR VEHICLE DEVICES

Application filed March 19, 1929. Serial No. 348,192.

The present invention relates generally to switches for the operating of signals and particularly to automatic switches for the operation of left-right turn signals of motor vehicles.

My improved switch comprises, broadly, a number of individual switches contained within a box preferably mounted on the steering post of a motor vehicle conveniently placed near the hand of the operator. The individual switches are closed by the operator to indicate left or right turns to be made by the vehicle.

At the completion of the turn the switches are automatically opened by switch-operating arms which are acted upon by cam grooves in a cylindrical plate carried by the steering wheel.

The primary object of my invention is to provide a series of switches for operating signals for left or right turns of a vehicle at any interval of time prior to the actual making of the turn and to provide for automatically discontinuing of the signals at the completion of the turn without manual manipulation by the operator.

Another object of my invention is to automatically provide an audible alarm with all signals to warn and attract the attention of pedestrians and operators of approaching vehicles to the signals which can be used at the will of the operator.

Another object of my invention is to provide a signal operating device which can be readily installed on any motor vehicle without detracting from the appearance of the vehicle.

Other objects and advantages of my invention will be apparent with reference to the following specification and accompanying drawing, wherein:

Fig. 1 is a plan view of my invention attached to the steering wheel of a motor-driven vehicle.

Fig. 2 is a side elevation of my invention.

Fig. 3 is a view of a portion of the cam cylinder flattened to illustrate return grooves or cams and their relative positions to their respective switch operating arms.

Fig. 4 is a view in plan of the switch box.

Fig. 5 is a sectional view in elevation taken on line 5—5 of Fig. 4.

Fig. 6 is a sectional view of the switch box taken on line 6—6 of Fig. 4.

Fig. 7 is a front view of the switch box taken on line 7—7 of Fig. 4.

Fig. 8 is a sectional view taken on line 8—8 of Fig. 3.

Fig. 9 is a sectional view in elevation of a modification of my invention illustrating the cam grooves in a horizontal position.

Fig. 10 is a plan view of the cam groove plates shown in Fig. 9.

Referring particularly to the accompanying drawing wherein like characters of reference designate corresponding parts, 1 indicates the steering wheel of a motor vehicle mounted in the usual manner on steering post 2. Clamping member 3 adjustably secured to steering post 2 has secured to its outer end a switch box 4.

Vertically mounted on springs 5 within the box 4 and extending through openings in the top 6 of box 4 are the two switch buttons 7 and 8.

On the upper surface of top 6 is rotatably mounted at 9 a finger lever 10 adapted to swing over either of the switch buttons 7 and 8 as indicated in dotted lines at 10', Fig. 4.

Through arcuate slot 11 in the top 6 depends arm 12 which is rigidly secured to the under surface of lever 10 and carries at its lower end cam member 13, the function of which will be described later.

Through the slots 14 in the front of box 4 and extending substantially in a horizontal position toward the steering post are switch operating arms 15 and 16 slidably mounted in posts 17 and 18, respectively.

Surrounding steering post 2 directly below steering wheel 1 and attached to the spokes thereof by clamps 19 is a hollow cylindrical member 20 the outer surface of which is grooved at 21 and 22 of uniform depth, and adapted to receive the outer ends of arms 15 and 16, respectively.

Grooves 21 and 22 are curved at 21' and 22', respectively, at which are cut short return grooves 23 and 24 and fitted with springs 23' and 24'. The grooves 23 and 24 are not cut as deep as grooves 21 and 22, thereby causing their associated arms 15 and 16 a sliding motion toward and into box 4 when acted upon by a rotation of the cam cylinder 20 by rotating wheel 1.

Springs 15' and 16' are mounted on arms 15 and 16 and maintain their outer ends in their respective grooves in plate 20.

When the operator desires to indicate that his vehicle will make a right turn he extends his finger below the steering wheel 1 and swings lever 10 from neutral position shown in solid lines Fig. 4 to the position 10' overlying switch button 7. The lower end of button 7 mounts an electric connection which contacts with 25 and 26 to close circuits to a signal horn and a signal light, respectively, which are not shown.

The under surface of lever 10 is grooved at 27 to allow button 7 to rise slightly after having been depressed thereby allowing the opening of the horn circuit after a very short interval. The circuit to the light through 26, however, is maintained to warn approaching vehicles of the turn to be made.

As the wheel 1 is turned to the right for the right turn of the vehicle, it carries the cam cylinder 20 with it in the direction of arrow "A" Fig. 3, causing the outer end of arm 15 to follow groove 21 to the curved portion 21' and then along 21' to pass spring 23' and into main groove 21 by virtue of the downward pressure of spring 28 on arm 15, Fig. 6.

When wheel 1 is reversed in direction to straighten the vehicle, arm 15 will reverse its direction of travel relative to groove 21 and will follow along spring 23' groove 23 and into its original position in main groove 21 as shown in Fig. 3. Groove 23 being of less depth than groove 21 imparts a longitudinal movement to arm 15 causing its inner end to come in contact with cam member 13 and through it cause lever 10 to be returned to neutral position as is clearly shown in Fig. 4.

For a left turn the principal and mechanical movement is the same as that just described and its description is therefore deemed unnecessary.

Figures 9 and 10 illustrate that the same results can be obtained with grooved plates 29 and 30 mounted around post 2 with arms 15 and 16 acting in grooves on the upper and lower sides of 29 and 30, respectively.

I claim:

1. In a device of the character described a switch-casing fixedly mounted in operative relation to the steering wheel of a vehicle, a plurality of resiliently mounted switch plungers in the casing being adapted to close various signal circuits on the vehicle, each plunger being normally in circuit breaking position and having an end thereof extended through a wall of the casing; a manually actuated lever pivoted on the casing and adapted to be selectively swung over the ends of said plungers to depress the same into circuit closing position; a release arm fixed on the lever and being extended into the casing and being adapted to move with the lever; reciprocable releasing elements resiliently mounted on the casing and being normally held in inoperative relation relatively to said arm; and means connected to the steering wheel to rotate therewith and being adapted to move the respective releasing elements into contact with the said arm so as to force said arm into neutral position thereby to cause the automatic release of the respective plungers into circuit breaking positions.

2. In a device of the character described a switch casing fixedly mounted relatively to the steering wheel of a vehicle, a plurality of resiliently mounted switch plungers in the casing being adapted to close various electric signal circuits on the vehicle, each plunger being normally in circuit opening position; a manually actuated lever pivoted on the casing to be selectively moved over the ends of the respective plungers to depress the same into circuit closing position; a fixed arm extended at an angle from said lever; reciprocable releasing elements resiliently mounted relatively to the casing and being held normally in inoperative position relatively to said arm; and means connected to the steering wheel rotating therewith and being so connected to said elements as to move the respective releasing elements into engagement with the arm only during the respective return movements of the steering wheel after a turn is completed, thereby to move said arm into neutral position to cause the opening of the switch.

3. In a device of the character described a switch casing fixedly mounted relatively and in operative relation to the steering wheel of a vehicle; a plurality of resiliently mounted switch plungers in the casing being adapted to close various signal circuits on the vehicle, each plunger being normally held in circuit opening position; a manually actuated lever adjustably secured on the casing to be selectively moved over the ends of the plungers to depress the selected plunger into circuit closing position; an arm extended at angle from said lever; reciprocating elements resiliently mounted on the casing one on each side of the arm each being adapted to return the arm from its respective extreme positions into neutral switch releasing position, said elements being normally held in inoperative position relatively to said arm; and a cam being connected to the steering wheel to rotate therewith and engaging said elements, said cam being adapted to move the respective elements into engagement with the said arm so as to move the arm and the lever into switch releasing position.

4. A structure as recited in claim 3 in combination with means on the cam to render the cam inoperative during the initial turn of the steering wheel, to move the respective elements only on the return movement of the steering wheel.

5. The combination with a steering wheel and a stationary switch casing related thereto; of a resiliently mounted switch plunger in the casing being adapted to close an electric circuit on the vehicle and being urged normally in circuit opening position; a lever pivoted on the casing to move in a plane substantially at right angles to the axis of the plunger being adapted to be moved over the end of the plunger to depress the latter into circuit closing position; an arm extended from the lever in substantial parallelism with the plunger, said arm having a convex side; a reciprocating element extended through said casing toward the convex side of said arm, said arm being arranged to be out of the path of said element when the lever is disengaged from the plunger and to be in operative relation to said element when the lever depresses the plunger; resilient means to normally urge the said element away from said arm, and means rotating with the steering wheel and so connected with said element as to move the said element into contact with the convex side of said arm to push the latter out of the way thereby to move the lever off the end of the plunger.

6. The combination with a steering wheel and a stationary switch casing adjacent the steering wheel; of a resiliently mounted switch plunger in the casing being adapted to close an electric circuit on the vehicle and being urged normally in a circuit opening position; a lever pivoted on the casing being adapted to move over the end of the plunger to axially move the latter into circuit closing position, an arm extended from the lever, a releasing element slidable toward the arm, said arm being in an out of way position when the lever is disengaged from the plunger and is in operative relation to the said element when the lever is on the plunger end; resilient means to normally urge the said element away from the arm; and means rotating with the steering wheel and connected to said element to cause the latter to push the arm and the lever into plunger releasing position.

In testimony whereof, I hereby affix my signature this 4th day of March, 1929.

NICOLAS OCHINOFF.